United States Patent
Hawes et al.

(10) Patent No.: US 9,802,701 B1
(45) Date of Patent: Oct. 31, 2017

(54) VARIABLE ELEVATION SIGNAL ACQUISITION AND DATA COLLECTION SYSTEM AND METHOD

(71) Applicants: Joshua Hawes, Seattle, WA (US); George Pierce, Seattle, WA (US)

(72) Inventors: Joshua Hawes, Seattle, WA (US); George Pierce, Seattle, WA (US)

(*) Notice: Subject to any disclaimer, the term of this patent is extended or adjusted under 35 U.S.C. 154(b) by 0 days.

(21) Appl. No.: 14/919,645

(22) Filed: Oct. 21, 2015

Related U.S. Application Data

(60) Provisional application No. 62/066,793, filed on Oct. 21, 2014.

(51) Int. Cl.
*B64C 39/02* (2006.01)
*G01C 21/00* (2006.01)
*G05D 1/00* (2006.01)

(52) U.S. Cl.
CPC .......... *B64C 39/024* (2013.01); *G01C 21/005* (2013.01); *G05D 1/0011* (2013.01); *G05D 1/0088* (2013.01); *B64C 2201/024* (2013.01); *B64C 2201/108* (2013.01); *B64C 2201/122* (2013.01); *B64C 2201/141* (2013.01); *B64C 2201/146* (2013.01)

(58) Field of Classification Search
None
See application file for complete search history.

(56) References Cited

U.S. PATENT DOCUMENTS

| | | | |
|---|---|---|---|
| 6,366,780 B1 | 4/2002 | Obhan | |
| 6,726,148 B2 | 4/2004 | Carroll | |
| 6,840,480 B2 | 1/2005 | Carroll | |
| 6,845,303 B1 | 1/2005 | Byler | |
| 6,868,314 B1 | 3/2005 | Frink | |
| 7,039,367 B1 | 5/2006 | Kucik | |
| 7,611,092 B2 | 11/2009 | Silansky et al. | |
| 8,818,076 B2 | 8/2014 | Shenkar et al. | |
| 8,948,043 B2 | 2/2015 | Gerber et al. | |
| 8,970,400 B2 | 3/2015 | Verna et al. | |
| 2003/0048657 A1 | 3/2003 | Forbes | |
| 2003/0057325 A1 | 3/2003 | Carroll | |
| 2006/0119488 A1 | 6/2006 | Hoiness | |

(Continued)

*Primary Examiner* — Krishnan Ramesh
(74) *Attorney, Agent, or Firm* — Paul B. Heynssens; Attorney at Law, PLC

(57) ABSTRACT

The disclosure herein relates to the use of unmanned aerial vehicles (UAVs) to detect and map electromagnetic transmission and reception patterns for transmitting facilities such as cell towers and receiving facilities such as large buildings in urban areas. A variable elevation signal acquisition and data collection (VESAD) system is provided that includes an unmanned aerial vehicle (UAV) including a guidance subsystem, a data storage device, a global positioning system (GPS), an electromagnetic signal detector, a radio frequency receiver, at least one antenna and a signal processing subsystem are in operable communication. A ground control station is also included that is configured to exercise positive wireless control over the UAV via the at least one antenna and guidance subsystem. A communications link between the UAV and the remote control system configured to communicate data received from one of the signal processing subsystem in real time and the data storage device.

7 Claims, 10 Drawing Sheets

(56) References Cited

U.S. PATENT DOCUMENTS

| | | | |
|---|---|---|---|
| 2006/0211413 A1* | 9/2006 | Ariyur | H04W 16/18 455/423 |
| 2008/0210818 A1 | 9/2008 | Chiu et al. | |
| 2009/0195401 A1* | 8/2009 | Maroney | G06K 9/00335 340/686.6 |
| 2011/0006153 A1 | 1/2011 | Silansky et al. | |
| 2012/0271461 A1 | 10/2012 | Spata | |
| 2012/0299751 A1 | 11/2012 | Verna et al. | |
| 2013/0318214 A1* | 11/2013 | Tebay | H04L 67/10 709/219 |
| 2014/0018976 A1 | 1/2014 | Goossen et al. | |
| 2014/0141711 A1 | 5/2014 | Baker et al. | |
| 2014/0146173 A1 | 5/2014 | Joyce et al. | |
| 2014/0163772 A1* | 6/2014 | Vian | G05D 1/0094 701/2 |
| 2014/0172200 A1* | 6/2014 | Miralles | G05D 1/12 701/3 |
| 2014/0195150 A1* | 7/2014 | Rios | B64C 39/024 701/469 |
| 2014/0257595 A1 | 9/2014 | Tillmann | |
| 2014/0316614 A1 | 10/2014 | Newman | |
| 2015/0236778 A1 | 8/2015 | Jacali | |
| 2016/0300496 A1* | 10/2016 | Cheatham, III | G08G 5/0069 |

\* cited by examiner

VARIABLE ELEVATION SIGNAL ACQUISITION AND DATA COLLECTION SYSTEM AND METHOD

RELATED APPLICATIONS

The instant utility application claims priority from co-owned, provisional application 62/066,793, filed on Oct. 21, 2014, which is incorporated by reference herein in its entirety.

TECHNICAL FIELD

This description relates generally to communication signal collection and analysis, and more specifically to the use of unmanned aerial vehicles (UAVs) to detect and map electromagnetic transmission and reception patterns for cell sites in three or four dimensions.

BACKGROUND

The initial location and setup of any telecommunication component at a geographic location or alternatively cell site may be guided by data collected prior to construction. Additional post construction data may be useful to monitor performance metrics of the installed components in the cell site. The results of the post construction data may require adjustments to the orientation of antennae, changes/calibration to other installed support equipment, instrumentation upgrades, and/or changes to maintenance schedules in order to effect optimal system performance over time. Typical data of interest includes, but is not limited to, signal integrity, signal power level and electromagnetic interference (EMI).

Data of various sorts may be collected near a cell tower or at a distance from it. Optimal system performance of components or networks is often dynamic due to changes in the physical and radio frequency (RF) environments in close proximity to sites and changes to the physical and RF environments distant from sites. Dynamic changes can occur due to the time of the day (propagation characteristics), transient objects or obstacles that come and go in the site area, and the like.

Traditionally, data collection used to test and optimize RF and microwave networks has been accomplished by using a ground vehicle or a pedestrian equipped with an on-the-ground data collection receiver unit. Other performance data, such as passive intermodulation ("PIM") data is usually obtained by climber or riggers on a cell tower. Such methods have proven to be somewhat adequate but expensive. Such methods may also be limited due to their ability to collect data in only two dimensions simultaneously.

Ground vehicle data is restricted to a limited height above ground level of the collection unit. In rural and obstructed urban environments, it can be extremely difficult to collect signal and PIM data quickly, accurately and comprehensively. Hence, there is a need for systems and methods to collect electromagnetic signal data in a variety of three dimensional environments surrounding both signal transmitters and signal reception sites at near and far distances, and at various times.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The examples described herein include an apparatus such as a powered, miniature unmanned aerial vehicle (UAV) that is capable of measurement and data collection of radio frequency data in three, or four dimensions. The device to accomplish these measurements includes a remote control drone or UAV, that may include a powered airframe including payload attached thereto or made a part of the airframe. Such a payload for signal collection may include at least one radio frequency (RF) sampling antenna, signal measurement and data collection circuitry. The airframe may include a guidance and position tracking system having an antenna and radio frequency receiver carried aboard the airframe and operatively connected to the at least one control surface so that the UAV is remotely controlled. The signal measurement and data collection circuitry may also include a data module that can optionally be removed, the data module including a data storage device and an electromagnetic signal processing subsystem, the electromagnetic signal processing subsystem being coupled to the data storage device and at least one antenna for signal collection.

A variable elevation signal acquisition and data collection (VESAD) system is also provided. The VESAD system includes an unmanned aerial vehicle (UAV) described in the paragraph above. The system also includes a ground control station configured to exercise positive wireless control over the UAV via at least one antenna and guidance subsystem and includes a communications link between the UAV and the remote control system configured to communicate data received from one of the signal processing subsystem in real time and the data storage device.

A method for acquiring and collecting electromagnetic signal data from various altitudes is also provided. The method comprises the steps of programming a test method into a data storage device of an electromagnetic signal processing subsystem mounted on an unmanned aerial vehicle (UAV), programming a desired flight path for the UAV into the data storage device, launching the UAV, periodically receiving ambient electromagnetic signals by the electromagnetic signal processing system along the flight path, and transmitting the received ambient electromagnetic signals to a signal processing subsystem. The UAV comprises an airframe including a motor, a fuselage, and a wing attached thereto, at least one radio frequency (RF) antenna mounted on the airframe, at least one control surface disposed on the airframe; and a guidance system having a radio frequency receiver carried aboard the airframe and operatively connected to the at least one control surface and to the at least one RF antenna, and a data module attached to the fuselage. The data module includes the data storage device and the electromagnetic signal processing subsystem.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the examples and the sequence of steps for constructing and operating the example. However, the same or equivalent functions and sequences may be accomplished by different examples.

The examples below describe methods and systems to acquire and collect signal data at various elevations in a single sortie of an unmanned aerial vehicle ("UAV"). Although the present examples are described and illustrated herein as being implemented in a variable elevation signal acquisition and data collection ("VESAD") system, the systems described are provided as examples and not as limitations. As those skilled in the art will appreciate, the present examples are suitable for application in a variety of different types of VESAD systems.

In the examples described below an unmanned aerial vehicle is guided in front of RF transmission structure or communication sites (RF antennas, DAS, Small Cells, Wi-Fi, Point to point microwave and similar) at various positions over a cell site, to test and collect RF transmission signals in order to analyze signal strength and characteristics (including spectrum, signal integrity analysis, power measurement, optical), interference potential, electromagnetic energy (EME), and the like. In addition, Passive Intermodulation (PIM) measurements can be obtained. A light-weight testing and data collection device may be affixed to a UAV, which transmits real-time data to a ground based control unit or collects data for post-flight extraction and analysis.

Figure 1:
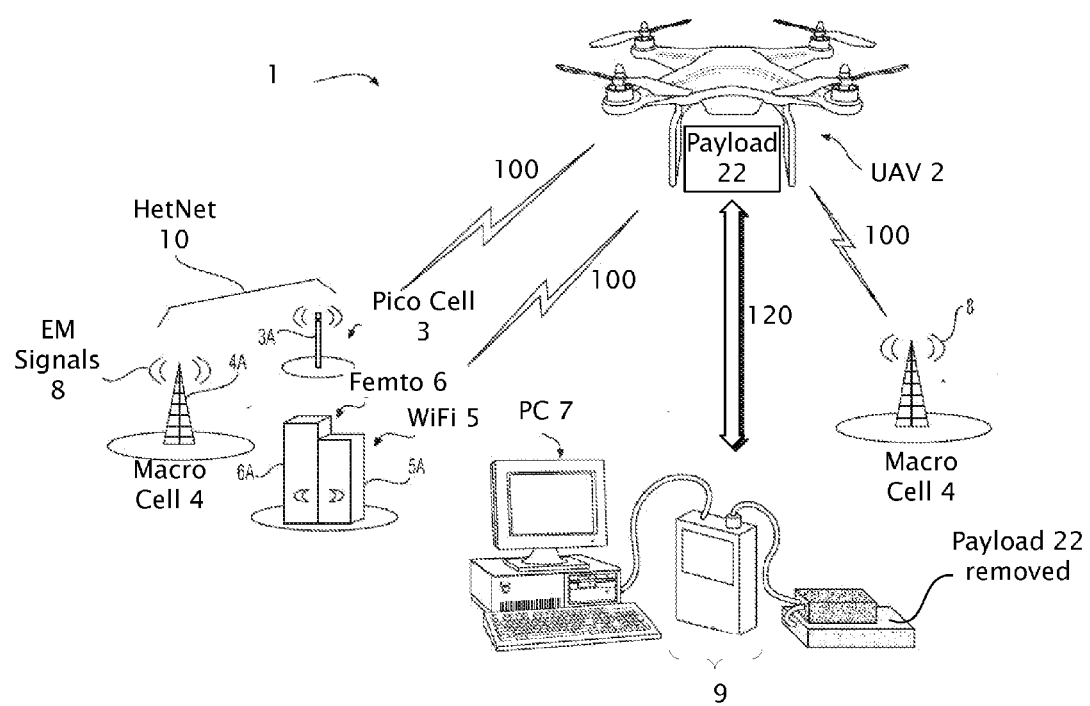
FIG. 1 is a depiction of an exemplary, non-limiting physical and radio frequency environment in which the systems and methods herein may operate.

FIG. 1 is a depiction of an exemplary, non-limiting physical and radio frequency environment in which the systems and methods herein may operate. The system will typically function in the RF/Microwave frequencies from 9 kHz to 300 GHz to collect RF/Microwave signal data in a three dimensional ("3D") variable elevation environment, and transmit that data for immediate analysis in the field.

Cellular environments currently consist of cell sites and networks which service cell phone/data customers. The cellular environment includes various elements such as macro cell towers, small cell sites, Wi-Fi hotspots, outdoor distributed antenna systems (DAS) and enterprise cell sites/Indoor coverage, indoor distributed antenna system (DAS) sites and the like. Small Cells may encompass Picocells, Microcells, Femtocells, and the like. These elements in combination can make up heterogeneous wireless networks (HetNet) 10. The current industry trend focuses on small cell sites and networks of small cell sites which are integrated with macros Wi-Fi and DAS sites. Location and orientation of antennae at all sites are typically a key to optimal performance of all elements in the cellular environment as well as frequency planning, provisioning, and deployment and signal propagation of each site. The goal is to deliver optimal customer/end user experience and optimize capacity and coverage which may be achieved by initial planning in combination with measurement and subsequent optimization in such systems.

Optimal system performance of elements or networks is dynamic due to changes to the physical and radio frequency environments surrounding close proximity to sites and changes to the physical and radio frequency environments surrounding distant sites. Such changes often result in signal degradation and interference. In an attempt to alleviate this problem a heterogeneous wireless network ("HetNet") 10 may be used to improve signal quality and the reliability because a failure in one RF network can be bridged to another network to overcome the shortcoming by the redundancy of another technology, typically in an alternative frequency band.

A HetNet 10 is a network connecting wireless devices with different operating systems and/or protocols. The HetNet may include various components such as macro cell towers 4, small cell sites (not shown), Wi-Fi hotspots 5, outdoor distributed antenna systems ("DAS"), and enterprise cell sites/indoor DAS sites (not shown). Small cell sites may include Picocells 3, Microcells and Femtocells 6, all of which may be conventionally constructed. These disparate components or elements in combination can comprise a HetNet 10.

The current industry trend tends to focus on small cell sites and networks of small cell sites that are further integrated with macro Wi-Fi and DAS sites. Location and orientation of antennae (3A-6A) at all sites is typically a key to optimal performance of all elements in the cellular environment as well as frequency planning, provisioning, deployment and signal propagation of each site. Good HetNet performance may typically rely on the best available data collected at the devices in the network.

Initial location of any component at a site is a function of data collected prior to construction. Additional periodic data collection is also useful to monitor performance metrics of installed elements. Results of post construction data collection may require adjustments to the orientation of antennae, changes to other installed instrument operation and calibration, upgrades to instrumentation and changes in the maintenance schedule to guarantee optimal system performance over time. Typical test data includes, but is not limited to, signal integrity and power levels, interference potential and electromagnetic energy. PIM measurements can show frequency clashes and/or degradation of signal from passive elements, typically on a tower.

Among other types of dynamic signal data that one may wish to collect to measure site performance, Passive Intermodulation (PIM) data can be collected that may uncover frequency clashes and/or the degradation of a signal from passive causes. PIM occurs when two or more signals are present in a passive device (cable, connector, isolator, switch, etc.) that exhibits a nonlinear response. The nonlinearity is caused by dissimilar metals, dirty interconnects, worn plating on bolts, or other anodic effects. Loose connections resulting in poor metal-to-metal contact are another source of PIM. Often times the nonlinearity does not manifest itself at low input signal levels because not enough stress is placed on the dielectric, or the PIM levels may be at thermal noise level.

The examples described herein uniquely utilize a UAV 2 to collect dynamic signal data 100, which may then be transferred 120 from the UAV, to ground based equipment 9, This may be done through a wireless coupling to the ground based equipment 9 or by removing a data module 22 from the UAV and using a cable to couple it to the ground based unit 9. Data is typically passed through a ground control unit 9, prior to processing on a computer 7. In this manner three dimensional data can be collected and mapped or plotted to display it as a three dimensional presentation. Alternatively the data may be collected from the same or similar flight plans at different times and plotted in so called four dimensional displays, or otherwise manipulated.

Ground based equipment 9 may be provided for remotely transmitting flight commands to UAV 11 and for receiving and analyzing data from the UAV. Ground equipment 9 may allow for the automation of control signals which are transmitted to UAV 11, typically originating in a PC 7 or the like. Ground control equipment 9 will be understood to include a radio frequency transmitter enabling remote communication, a spectrum analyzer, a PIM measurement analyzer, and an interface device such as control panel (not shown) for use by a human operator. The control panel could also comprise a computer 7 mouse and keyboard. Other input devices could likewise be used.

An advantage of the VESAD system is that many more data points may be collected at a multitude of elevations above ground level along with much quicker data acquisition. Data may be transmitted by VESAD to an on-the-ground unit such as Spectrum Analyzer outfitted with appropriate antenna to receive VESAD data or to a PIM measurement analyzer. Data can be almost instantly analyzed on location by available spectrum analysis software, and thus immediate adjustments described can be made to cellular equipment with immediate retesting being possible. Data can be transferred directly from VESAD during flight, or post flight thru cabling from the VESAD hard drive. Data also can be transferred from ground units thru cabling to PC for offsite analysis.

The VESAD system can more easily pinpoint maintenance issues identified by PIM measurements. VESAD can also significantly improve recommendations for location of small cell sites in urban areas. The VESAD system provides a more thorough and comprehensive data set than currently available, data is collected more cost effectively, yet faster and at a multitude of elevations above ground. VESAD facilitates faster retesting after any site adjustments or maintenance. This allows faster overall project completion, typically giving cellular providers better and a more robust data set to achieve improved spectrum efficiency, increased coverage and better overall system performance.

Figure 2:
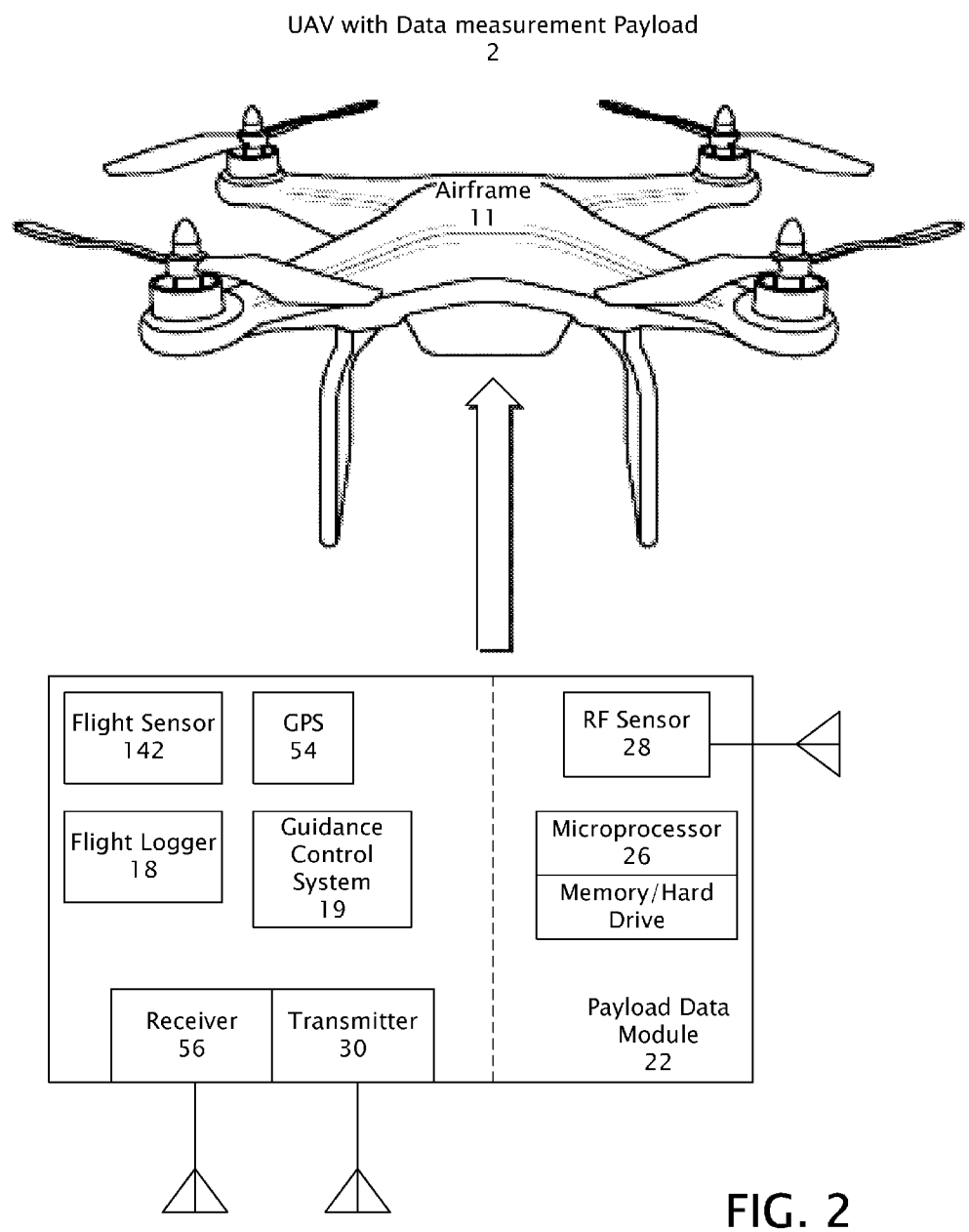
FIG. 2 is an illustration of an exemplary unmanned aerial vehicle (UAV) that may be suitable for use with the methods and systems described herein.

FIG. 2 is an illustration of an exemplary UAV 11 with data processing payload 22 that may be suitable for use with the methods and systems described herein. The instrumentation may be configured as a payload module 22, or alternatively as an integral part of the UAV 11. In other equivalent examples, a fixed wing UAV or the like may be employed. In particular any suitable UAV as known to those skilled in the art may be utilized to carry a payload 22 such as that of the system described herein.

The exemplary UAV airframe 2 may include a conventional airframe suitable for remote control to move the payload 22 carried by it about a suitable path where one may desires to make a measurement. The payload may include, a flight logger 18, at least one flight or data sensor 142, a GPS Including an integral antenna (not shown) 54, and a guidance control system 19. Also included are transmitters 56 and receivers 30 for receiving data signals such as directions or the like, and transmitting signals such as test data, or the like. Each unit has an appropriate antenna. Further included in the payload module are one or more RF/microwave sensors 28 coupled to an appropriate antenna. With aid of a conventional microprocessor 26, including a memory and/or hard drive, signal data collected by the RF sensor 28 may be coupled to transmitter 30 for direct transmission and analysis by remote instrumentation, or stored in memory or the hard drive for later download, processing and analysis.

The flight logger 18 is an automated aircraft system that automatically records flight data. Such data includes the latitude, longitude and altitude of the aircraft as it progresses along its flight path, with location information typically provided by a GPS device. This three dimensional position information may be associated by the logger 18 with specific operational information of the aircraft and environmental information, such that the position information serves as an index, marker or identifier of the operational information and/or environmental information as a function of position of the UAV in three dimensions. Time of data acquisition may also be recorded through interfacing with a clock circuit (not shown).

Flight sensor(s) 142 include one or more sensors for sensing any of, and preferably all of, roll, pitch, yaw, elevation, azimuth, and speed. These may take the form of, for example, a laser altimeter, an acoustic altimeter, roll and pitch gyroscopes, and yaw sensors such as a flux gate compass, among others. These types of flight sensors are well understood by those skilled in the art and no further explanation will be provided herein.

Data module 22 encompasses all or most of the electromagnetic signal handling and processing apparatus associated with airframe 11 as well as containing a microprocessor 26. Microprocessor 26 will be understood to include suitable memory devices including hard drives (not shown) and is operably connected thereto or therein and necessary programming thereof. The detection of the electromagnetic signals for the data module 22 may be performed by one or more RF/microwave sensors 28 which may be contained within or on the airframe 11, or included as part of the payload 22.

The purpose of the data module 22 is to facilitate the collection of electromagnetic signal data in a three dimensional physical/RF environment typically like that of an exemplary HetNet (10 of FIG. 1) or equivalent. There may be multiple types of data modules 22 depending upon the type of measurements being made. Alternatively, differing data collection devices may be combined in a single module. The various data modules or payloads 22 may share certain functional characteristics, while differing in data acquisition and transmission hardware and vice versa. It will be recognized by those skilled in the art that electromagnetic signal sensing and data capture equipment other than those described or cited herein could be adapted for use with the UAV airframe 11. Therefore this disclosure is not to be considered limited to a particular sensor 28 and data module 22 that has been chosen for purposes of illustration and disclosure herein.

UAV 11 also contains a radio frequency transmitter and antenna 30 that enables UAV 11 to transmit data and to also serve as a relay station for in-flight data transfer between two remote points. An illustrative example is the detection of electromagnetic signals from a cell tower by sensor(s) 28 at a particular waypoint which are then relayed to ground control unit (9 of FIG. 1) via transmitter 30.

Guidance system 19 may include certain flight control apparatus (not shown) typically contained aboard UAV 11. This flight control apparatus may include, in addition to its microprocessor, an electrically or mechanically operated servomechanism (not shown) for operating a UAV control surface.

One or more radio frequency and/or microwave receivers 56 may be mounted in the payload module 22 or airframe 11. Receiver(s) 56 communicate command signals from the ground based equipment (9 of FIG. 1) to guidance system 19. For example, Radio receiver 56 may receive GPS input signals and communicates the same to guidance system 19. Alternatively, a separate, dedicated GPS system 54 may be provided and connected to guidance system 19.

The guidance control system 19 may control all aspects of flight from predetermined data. Such predetermined data may be as a set of waypoints that are inputted and then followed in conjunction with feedback from GPS system 54. Altitude and velocity of the UAV 11 may be, and preferably are, automatically managed. However, velocity control or flight path control may also be provided remotely from signals transmitted to receiver 56, and in turn communicated to guidance system 19, from ground control equipment (9 of FIG. 1).

In making signal measurements it may be desirable to program various flight paths that are suitable for the environment being measured. The UAV may be programmed to collect data points and data type (spectrum, EME, PIM or the like) according to preference. For example, in an urban environment data collection at the face of a multi-story structure would likely be done in a flat planar grid fashion, from ground floor to roof top surfaces. An example in a rural environment would be circumferential patterns at certain radii from a macro tower at several elevations.

The data collection described below includes setting predefined GPS points "waypoints" to guide the UAV to collect data at typically critical network locations and elevations, free-flying the UAV during a heavy traffic time such as an outdoor sports event to monitor network performance or vertically up (or down) a multi-story building or a possible obstruction. Viewed in three dimensions, this forms a cylindrical pattern. Small cell sites and networks may often require, depending on environment, a combination of flat or planar, and cylindrical grids. In any case, the multitude of easily obtained data points obtainable with the equipment described herein provides a more complete picture of the RF environment.

Figure 3:
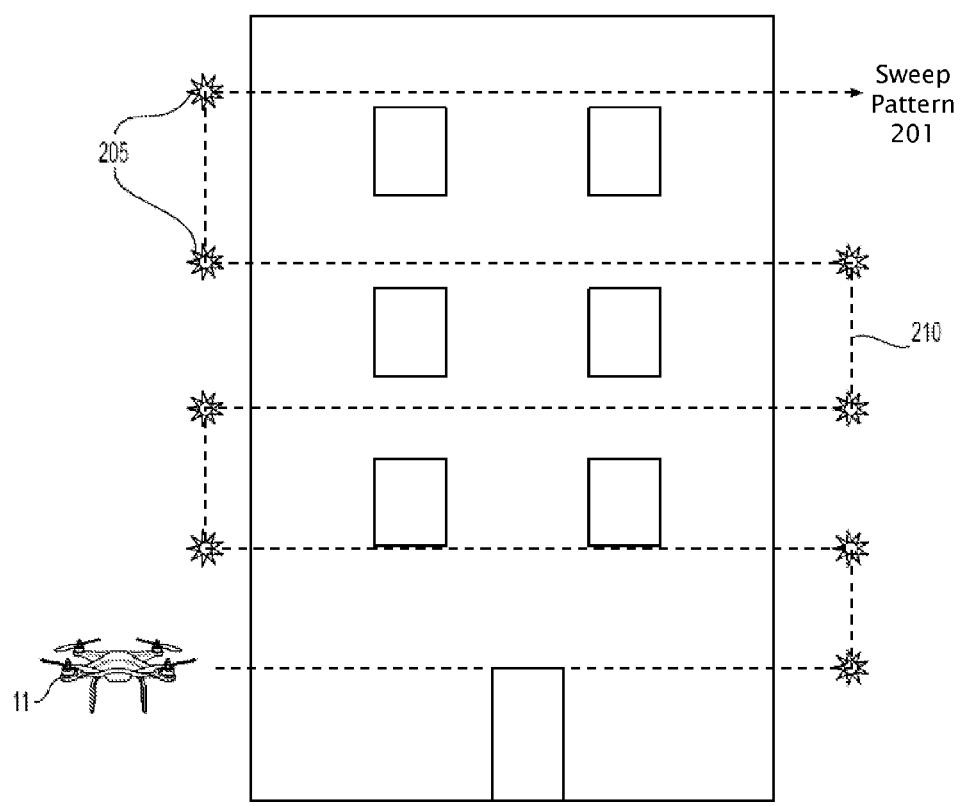
FIG. 3 is an illustration of an exemplary, non-limiting UAV pre-defined flight plan suitable for signal acquisition and data collection for a reception site such as a building.

FIG. 3 is an illustration of a first exemplary UAV flight plan 210 suitable for signal acquisition and data collection for a reception site such as a building. Cellular telephone users all demand good phone service. However, not all locations in a building receive the same signal or the signal strength. A UAV can provide low cost signal monitoring on a room-by-room basis thereby for allowing the service provider to adjust their transmission facilities, or the building owner can provide the information to tenants.

The exemplary flight plan 210, is a simple two dimensional sweep pattern 201 oriented in a vertical plane. Flight plan 210 is defined by a collection of way points 205, each of which represent a three dimensional point in space. In operation, the UAV in conjunction with feedback from GPS system (54 of FIG. 2) automatically adjust its velocity to traverse from one waypoint to the next in the collection of waypoints without the necessity of ground control. The use of waypoints 205 to construct airline routes in the aviation industry is well known, but is unknown for collecting electromagnetic signal data around structures. The collection of waypoints 205 comprising the flight plan 210 may be stored in a dedicated data storage device 27 aboard the UAV 11, or may be stored in a cache memory that may be included in a microprocessor (26 of FIG. 2). However, any other memory devices such as an exemplary hard drive (not shown) known in the art may be used and placed anywhere in the UAV11 if they prove to be convenient.

Alternatively, the waypoints 205 may be stored in the ground control system (9 of FIG. 1) and used by the ground control equipment to control the flight path of the UAV 11 in real time or near real time. By flying the exemplary flight plan 210, the electromagnetic signal processing subsystem (28 of FIG. 2) is able to detect the signal type(s) (8 of FIG. 1) and strengths of those signals at each waypoint 205 from any of the macrocells (4 of FIG. 1), wifi hotspots (5 of FIG. 1), picocell (3 of FIG. 1) or other RF/microwave transmitter within a HetNet (10 of FIG. 1) that fall within the range of frequencies extending from about 9 kHz to 300 GHz.

Figure 4:
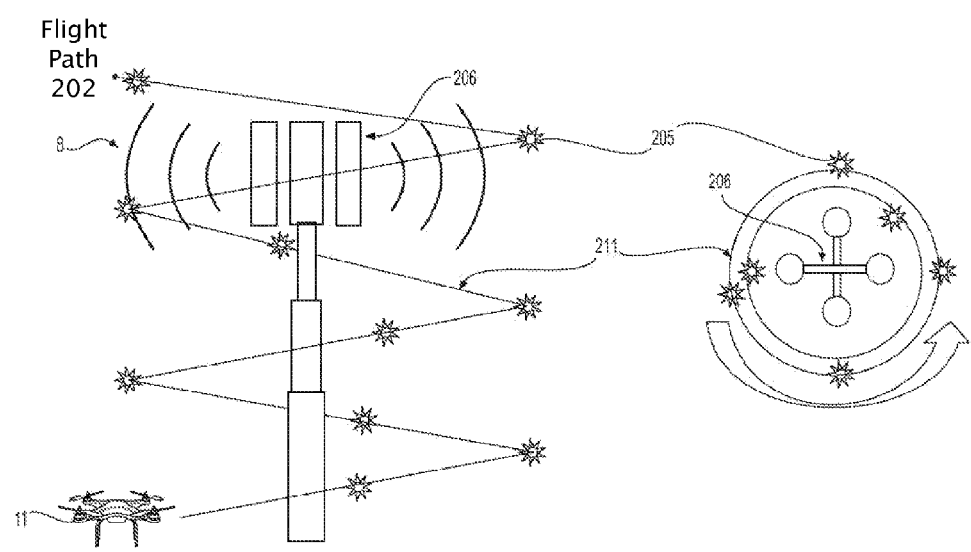
FIG. 4 is another exemplary, non-limiting pre-defined flight path.

FIG. 4 is another exemplary flight plan 211 that is a three dimensional flight pattern. Such patterns may be useful in detecting and mapping the signal output strength and EMI around a transmission antenna 206. The flight pattern 202 created by the waypoints 205 comprising the flight pattern 202 may constitute a helical pattern that may alternatively be described as a cylindrical pattern. The same flight pattern 202 may also be used in regard to the building of FIG. 3 to map electromagnetic signals 8 along the flight path. In particular the data so collected may be rendered in a three dimensional model utilizing modeling techniques known to those skilled in the art. In a further alternative example four dimensional renderings over time may be produced, where data collected at various times may be presented, superimposed or otherwise manipulated to compare three dimensional performance at various times.

Figure 5:
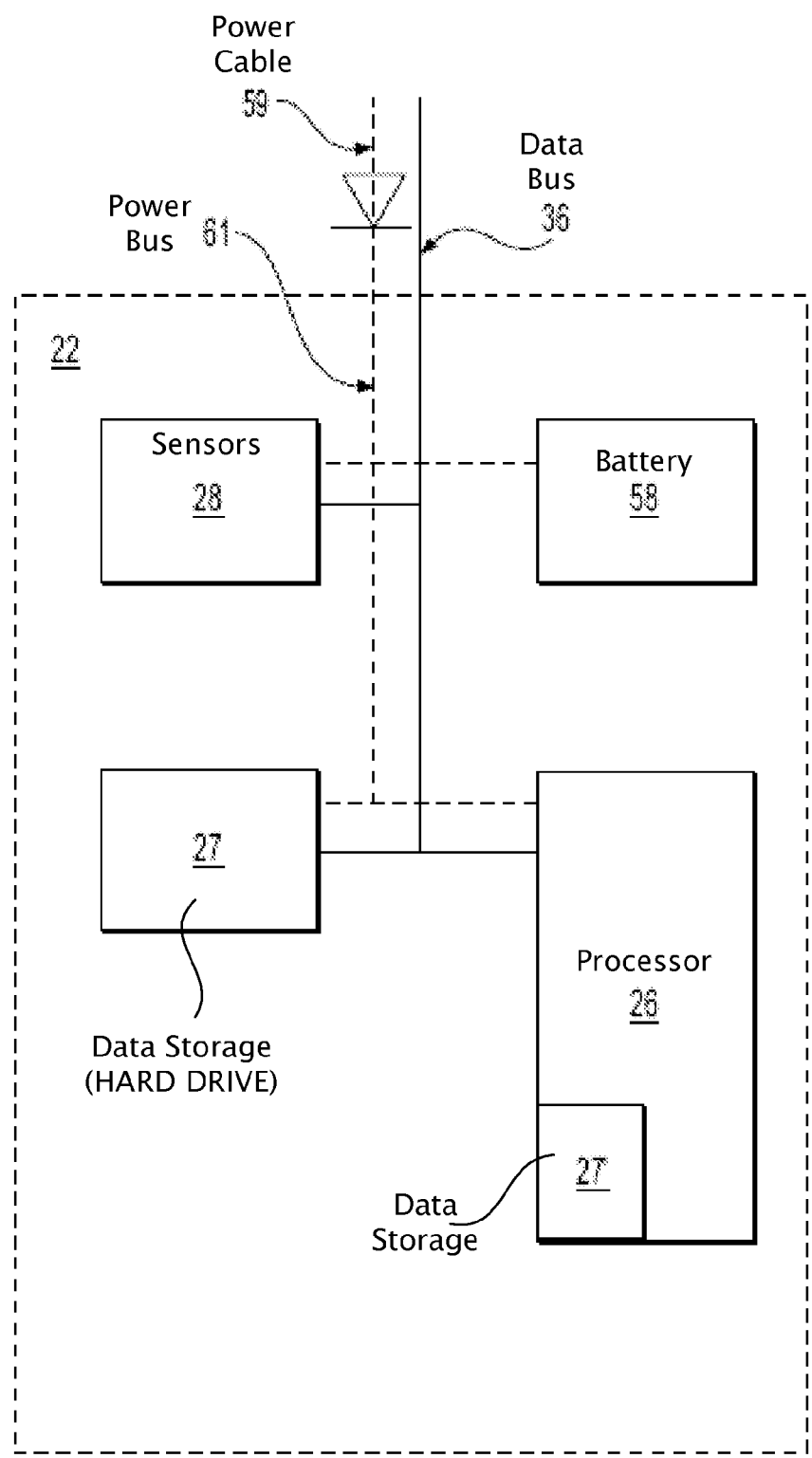
FIG. 5 is a simplified, non-limiting block diagram of the data module.

FIG. 5 is a functional block diagram showing further detail of the data payload module 22. Although data module 22 is shown in FIG. 2 as being located as one unit on the underside of airframe 11, those of ordinary skill in the art will recognize that data module 22 is merely exemplary. Data module 22 and/or any of its components may be located in alternative parts of the fuselage (11 of FIG. 2) without departing from the disclosure herein.

As briefly mentioned, supra, the data module 22 and/or its components may be powered from a dedicated battery 58, from the generator (not shown), or from a general service battery (not shown). Power may also be delivered to the data storage module 22 via a power cable 59 from battery 58 via a local power bus 61.

Data transfer to and from the data module 22 is communicated over the data bus 36. Among other components, data bus 36 forms a data link between GPS system (54 of FIG. 3), radio receiver (56 of FIG. 3), radio transmitter (30 of FIG. 3), data storage device 27 sensor(s) 28 and processor(s) 26.

Data storage 27 may be any type of data storage device known in the art or that may be developed in the future that is suitable for the purposes described herein. Some exemplary data storage devices may include, but not are not limited to, a hard drive, a flash memory, ROM, EEPROM, RAM, SRAM, registers and removable disks.

The sensor(s) 28 may be any electromagnetic signal detector known in the art, or that may be developed in the future, that may be configured to detect electromagnetic signals in the radio frequency or microwave frequency band (9kHZ-300 GHz). Exemplary non-limiting signal detectors include but are not limited to amplitude modulation (AM) detectors, frequency modulation (FM) detectors, phase modulation detectors, phase locked loop detectors.

AM detectors include envelope detectors such as plate detector, grid-leak detector and transistor equivalents of them, infinite-impedance detectors (peak detector circuits), and precision rectifiers; and product detectors. A product detector is a type of demodulator used for AM and single side band (SSB) signals, where the original carrier signal is removed by multiplying the received signal with a signal at the carrier frequency. Rather than converting the envelope of the signal into the decoded waveform by rectification as an envelope detector would, the product detector takes the product of the modulated signal and a local oscillator.

FM detectors use a frequency selective inductor-capacitor network to accomplish demodulation. Exemplary FM detectors include, but are not limited to Foster-Seeley discriminators and variants thereof, quadrature detectors, Travis discriminators, Weiss discriminators, phase detectors, and pulse count discriminators. Pulse count discriminators convert the frequency of the signal to a train of constant amplitude pulses, producing a voltage directly proportional to the frequency.

A phase-locked loop detector requires no frequency-selective inductor-capacitor network to accomplish demodulation. In these types of systems, a voltage controlled oscillator (VCO) is phase locked by a feedback loop, which forces the VCO to follow the frequency variations of the incoming FM signal. The low-frequency error voltage that forces the VCO's frequency to track the frequency of the modulated FM signal is the demodulated audio output.

Processor(s) 26 may be any computer processor known in the art and that may be developed in the future. Processor 26 may also be a field programmable gate (FPGA) or other field programmable logic device (PLD). FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory. FPGA's may be reprogrammed from alternative instructions in real time to direct the various logic blocks to perform a different function to the one previously performed. Hence, one Processor 26 may be used to operate disparate types of sensors 28 nearly simultaneously.

Figure 6:
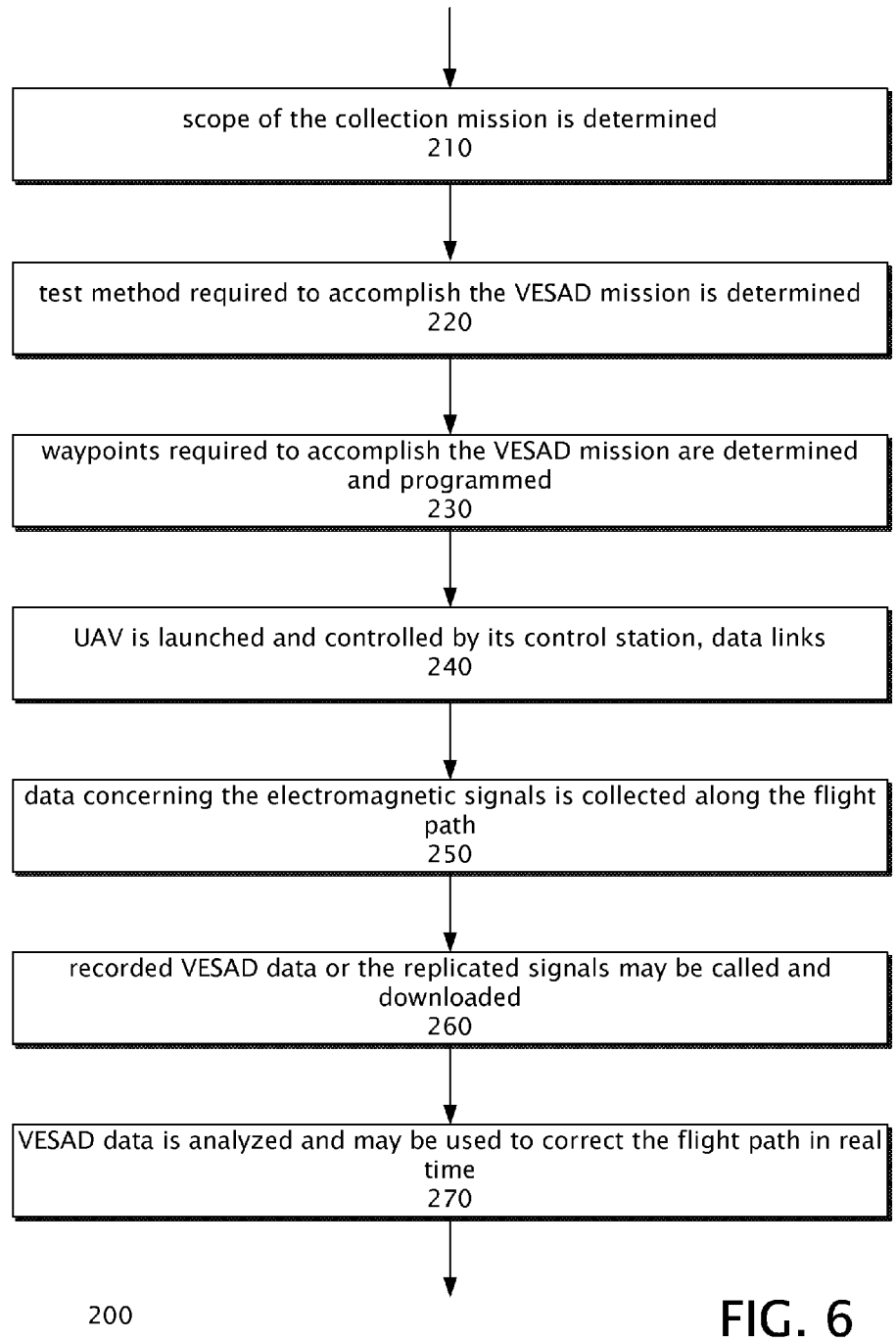
FIG. 6 is a flow block diagram of an exemplary, non-limiting variable elevation signal acquisition and data collection ("VESAD") method.

FIG. 6 is a block flow diagram of an exemplary, non-limited VESAD method 200. The method 200 begins at process 210, where the scope of the collection mission is determined. Exemplary determinants of the scope of the collection mission may include the type of signal to be collected, the type of structure to be surveyed, the weather conditions, the maximum altitude to be attained, the physical/RF environment (1 of FIG. 1), the topology and the type of UAV available.

At process 220, the test method required to accomplish the VESAD mission is determined. The test method may indicate the type of sensor (28 of FIG. 2) that should be used, the programming of the processor (26 of FIG. 2) and the flight path that should be flown.

At process 230, the waypoints required to accomplish the VESAD mission are determined and programmed into memory. The waypoints may define any flight path necessary to survey the target RF environment 1 but may include specific patterns such as the three dimensional helix/cylinder path (202 of FIG. 4) or the two dimensional sweep path (201 of FIG. 3). Flight paths may also include predetermined GPS waypoints and elevations, and a free-fly, or undetermined flight path.

In the alternative, the UAV may be programmed to autonomously "free-fly" within the RF environment 1 that is based on the outer limits of a predetermined three-dimensional outer volume and the strength, frequency and modulation of electromagnetic signal patterns detected within the volume limits. Of course, the UAV may be conventionally free-flown under positive control by ground control equipment (9 of FIG. 1).

Further, the UAV may be programmed to hover at a single waypoint to serve as a temporary communication site. The position of the waypoint may be adjusted by positive control by ground equipment 9 in order to maximize signal reception and retransmission. Or, the UAV may self-adjust its waypoint after signal analysis and signal re-transmission optimization by data module (22 of FIG. 2)

At process 240 the UAV is launched and controlled by its control station, data links (31 of FIG. 1), telemetry, and communications and navigation equipment.

At process 250, data concerning the electromagnetic signals (8 of FIG. 1) may be collected along the flight path according to the test method determined in process 220. Herein after the data collected will be referred to herein as "VESAD data." In an example, the VESAD data is collected by the data module (22 of FIG. 2) continuously along the flight path. At each waypoint the continuous recording is indexed by the UAV's flight logger (18 of FIG. 2) by its three dimensional position. The VESAD data may be a replication of the actual electronic signal(s) (8 of FIG. 1) detected or may be continuous steam of data derived from the detected electromagnetic signals (8 of FIG. 1) by detector (28 of FIG. 2) and/or processor (26 of FIG. 2).

In an equivalent alternative, electromagnetic signals or the VESAD data derived therefrom are detected, recorded and indexed only at the specific waypoints.

At process 260, the recorded VESAD data or the replicated signals may be called from the data storage device (27/27 of FIG. 5) and downloaded to the ground control equipment (9 of FIG. 2) via transmitter (30 of FIG. 2). In an equivalent alternative example, the VESAD data may remain in data storage device (27/27 of FIG. 5) and downloaded via a cable (not shown) upon the UAV landing. It should be noted, however, that UAV may be used simply as a relay station that retransmits the detected electromagnetic signals 8 to the ground control computer (7 of FIG. 1) via the ground control equipment (9 of FIG. 1) station for processing and analysis.

At process 270, the VESAD data is analyzed and may be used to correct the flight path in real time. In one example the VESAD may be overlaid upon a digital map of the RF environment 1. In other instances a three dimensional model of VESAD data may be produced showing data, or manipulated data as a surface or other convenient representation.

Data may also be collected at one or more times so that a fourth dimensional representation may be provided.

Figure 7:
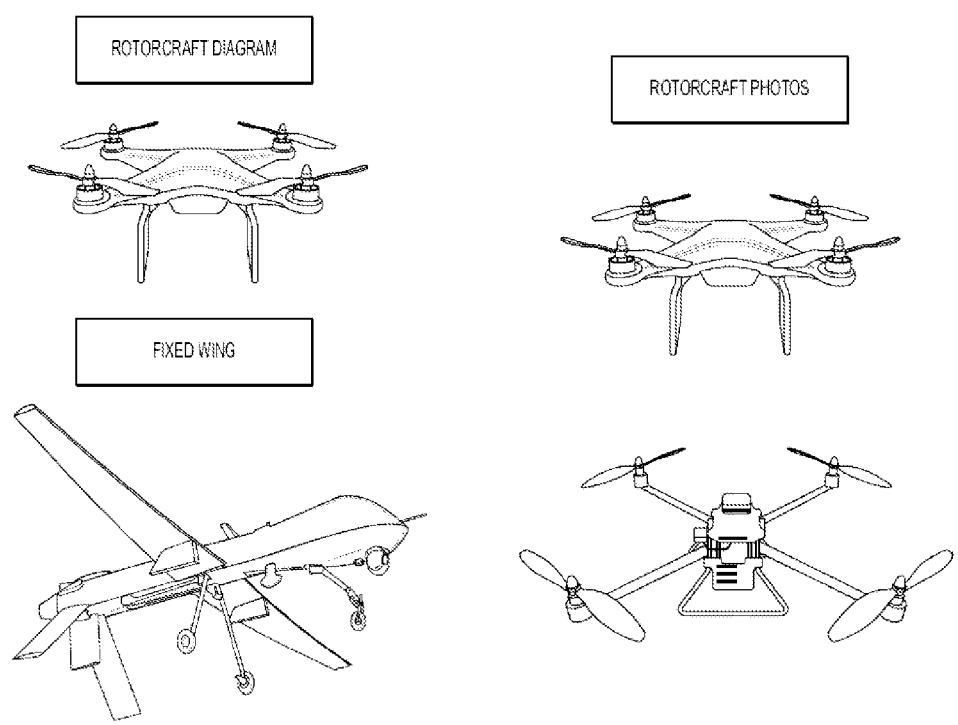
FIG. 7 depicts various exemplary, non-limiting examples of a UAV.

FIG. 7 includes depictions of various exemplary, non-limiting types of UAV's that currently exist that may be suitable for use in executing method 200.

Figure 8:
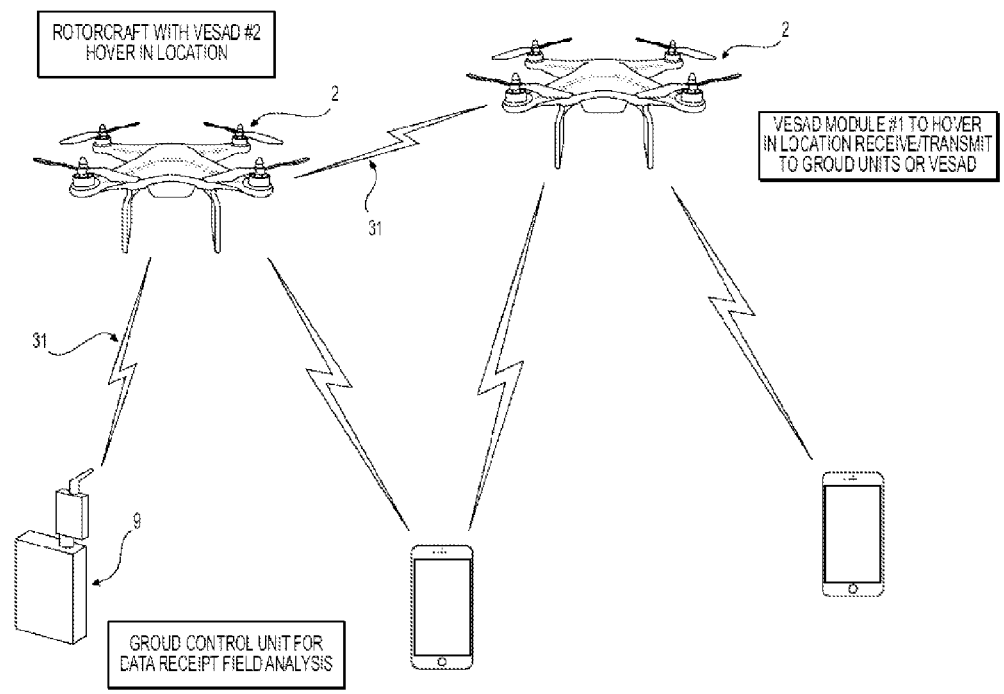
FIG. 8 depicts an example where a VESAD UAV is used as a hovering communications site.

FIG. 8 depicts an example where a VESAD UAV s used as a hovering communications site. In this example the VESAD UAV 2 is in effect acting as a cell site transmitting data 31, which may be analyzed 9.

Figure 9:
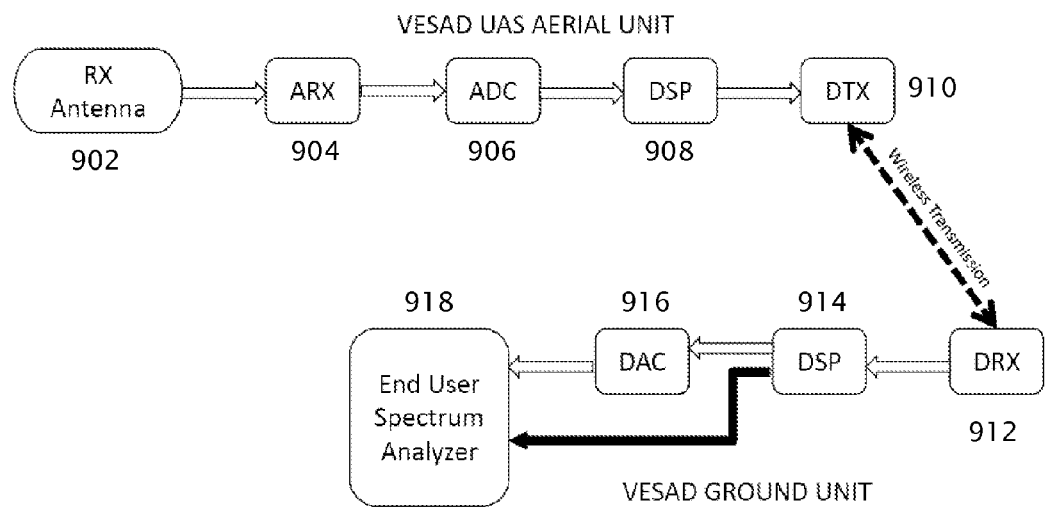
FIG. 9 is a block diagram showing signal processing in the VESAD aerial unit and ground units.

FIG. 9 is a block diagram showing signal processing in the VESAD aerial unit and ground units 900. The VESAD Aerial unit may include a RX antenna 902, coupled to an analog receiver 904, which may be in turn coupled to an analog to digital converter 906. The digital output of ADC 906 may be coupled to a digital transmitter 910. Wireless signal output of digital transmitter 910 may be coupled to digital receiver 912's input in the VESAD ground unit. The digital receiver output may be coupled to digital signal processor 914, whose output may be directly routed to a spectrum analyzer 918, or via DAC 916.

Figure 10:
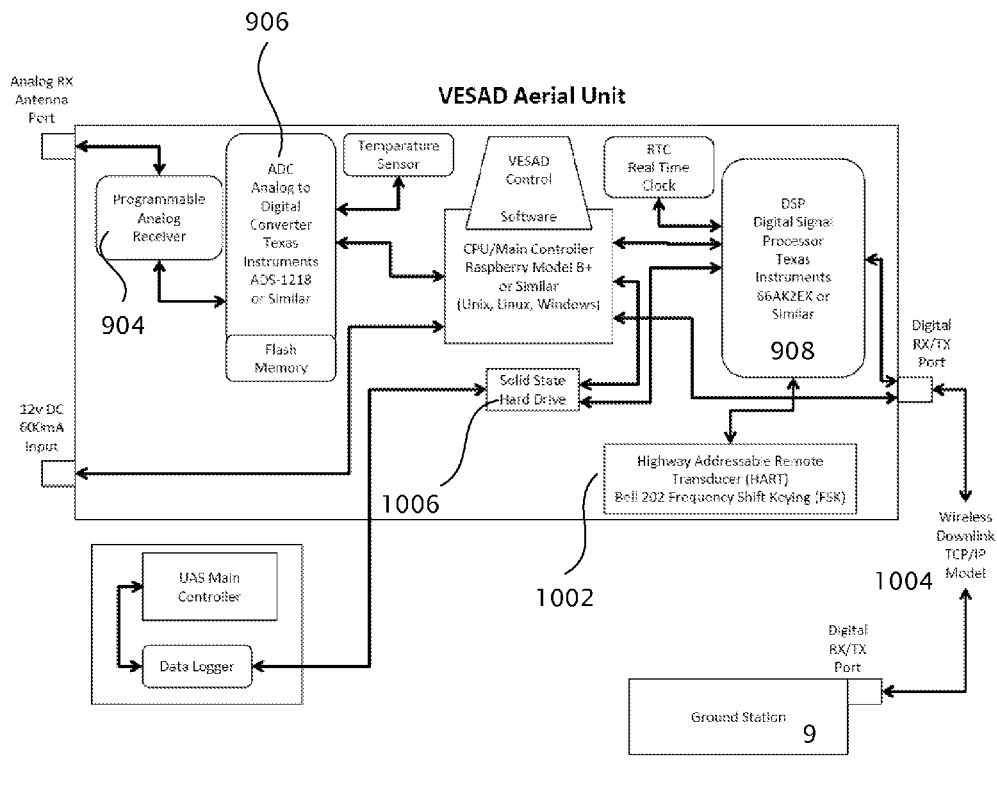
FIG. 10 is a block diagram showing further details of the VESAD aerial unit of FIG. 9.

FIG. 10 is a block diagram showing further details of the VESAD aerial unit of FIG. 9. The receiving analog antenna (not shown) may be attached to the VESAD N-Type connector or equivalent. Analog RF data is then received by the programmable Analog Receiver 904 and then processed by the Analog to Digital Converter (ADC) 906. The Digital Signal Processor 908, in conjunction with a Highway Addressable Remote Transducer (HART) 1002, processes the digital data for Ethernet delivery. The processed digital data is delivered to the ground station 9 for end user review via a wireless downlink 1004, and is also saved to an onboard, solid-state hard drive 1006. The data saved to the VESAD hard drive is matched to the Unmanned Aircraft's geographical data, so that a cloud point (CP) is created several times a second.

Each CP may contain latitude, longitude, elevation, frequency and frequency strength, which may then be processed with 3D Modeling software to create a visual interpretation of the RF environment. Typical Analog to Digital Convertors use a flashed main controller to manage this process with limited user inputs. The VESAD unit may utilize a microcomputer with the ability to run a Unix, Linux or Windows based operating system, which in turn will allow a C++ and Java software environment and the ability to adjust the analog data received by the VESAD unit while the UA is in-flight.

Additionally, the VESAD unit may receive digital data from the ground station, and through the reverse process, output the analog data. Because the UAV is operated above the ground level it would effectively extend the range of a ground based analog transmitter, such as a UHF/VHF radio.

The detailed description provided herein is merely exemplary in nature and is not intended to limit the invention or the application and uses of the invention. As used herein, the word "exemplary" means "serving as an example, instance, or illustration." Thus, any example described herein as "exemplary" is not necessarily to be construed as preferred or advantageous over other examples. All of the examples described herein are provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the examples disclosed herein may be implemented as electronic hardware, computer software, or combinations of both. Some of the examples and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an example of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples described herein are merely exemplary implementations.

The various illustrative logical blocks, modules, and circuits described in connection with the examples disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or UAV. In the alternative, the processor and the storage medium may reside as discrete components in a user terminal or UAV.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary example has been presented in the foregoing detailed description of the invention, it should be appreciated that a vast number of variations exist. It should also be appreciated that the exemplary example or exemplary examples are only examples, and are not intended to limit the scope, applicability, or configuration of the invention in any way. Rather, the foregoing detailed description will provide those skilled in the art with a convenient road map for implementing an exemplary example of the invention. It being understood that various changes may be made in the function and arrangement of elements described in an exemplary example without departing from the scope of the invention as set forth in the appended claims.

What is claimed is:

1. A variable elevation signal acquisition and data collection (VESAD) system, comprising:
   an unmanned aerial vehicle (UAV) including a removable payload including: a guidance subsystem, a data storage device, a global positioning system (GPS), an electromagnetic signal detector configured for the measurement of passive intermodulation data, an analog to digital converter, a radio frequency receiver, a radio frequency transmitter, at least one antenna and a signal processing subsystem in operable communication with each other, and operable to collect cellular radio frequency measurements about a cell tower at varying heights, convert the cellular radio frequency measurements to a digital signal representative of the cellular radio frequency measurements;
   a ground control station configured to exercise positive wireless control over the UAV via the at least one antenna and guidance subsystem and including a passive intermodulation measurement analyzer to process the cellular radio frequency measurements received from the UAV; and
   a communications link between the UAV and the ground control station configured to receive a radio frequency signal transmitting the digital signal representative of the cellular radio frequency measurements from the UAV, wherein the passive intermodulation analyzer processes the digital signal representative of the cellular radio frequency measurements, and alters a measurement pattern flight plan of the UAV, based on analysis of the digital signal representative of the cellular radio frequency measurements processed by the passive intermodulation analyzer.

2. The System of claim 1, further comprising a flight data logger.

3. The System of claim 1, wherein the signal processing subsystem is configured to record data about digital signal representative of the cellular radio frequency measurements detected by the electromagnetic signal detector.

4. The system of claim 1, wherein the electromagnetic signal detector produces a continuous measurement of the digital signal representative of the cellular radio frequency measurements.

5. The system of claim 4, wherein the digital signal representative of the cellular radio frequency measurements is retransmitted to the ground control station via the communications link for a given measurement location at a plurality of times.

6. The system of claim 4, wherein the electromagnetic signal detector detects the digital signal representative of the cellular radio frequency measurements periodically.

7. The system of claim 1, wherein the flight data logger indexes continuous facsimile of the digital signal representative of the cellular radio frequency measurements with the time and three dimensional location of the UAV when the electromagnetic signal was detected.

* * * * *